US012716567B2

(12) United States Patent
Robertson et al.

(10) Patent No.: US 12,716,567 B2
(45) Date of Patent: Aug. 25, 2026

(54) VEHICLE VENT PATCHES

(71) Applicant: FORD GLOBAL TECHNOLOGIES, LLC, Dearborn, MI (US)

(72) Inventors: Michael Robertson, West Bloomfield, MI (US); Venkatesh Krishnan, Canton, MI (US); Segundo Baldovino, Novi, MI (US); Aaron Bradley Johnson, Allen Park, MI (US); Adam Chase-Azzaoui, Apopka, FL (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 19/344,934

(22) Filed: Sep. 30, 2025

(65) Prior Publication Data

US 2026/0098625 A1 Apr. 9, 2026

Related U.S. Application Data

(62) Division of application No. 18/905,479, filed on Oct. 3, 2024, now Pat. No. 12,455,060.

(51) Int. Cl.
*F21S 45/30* (2018.01)
*B60Q 1/00* (2006.01)
*F21S 45/60* (2018.01)

(52) U.S. Cl.
CPC ............ *F21S 45/30* (2018.01); *B60Q 1/0023* (2013.01); *F21S 45/60* (2018.01)

(58) Field of Classification Search
CPC .......... F21S 45/30; F21S 45/60; B60Q 1/0023
USPC ........................................ 362/547, 294, 373
See application file for complete search history.

(56) References Cited

U.S. PATENT DOCUMENTS

| | | | | |
|---|---|---|---|---|
| 6,224,247 | B1 * | 5/2001 | Ashizawa .............. | F21S 45/33 362/345 |
| 7,217,314 | B2 | 5/2007 | DeGuiseppi et al. | |
| 8,828,125 | B2 | 9/2014 | Furuuchi et al. | |
| 9,534,760 | B2 | 1/2017 | Sander et al. | |
| 10,458,640 | B2 | 10/2019 | Tezuka et al. | |
| 10,746,373 | B2 | 8/2020 | Hamid et al. | |
| 11,700,699 | B2 | 7/2023 | Yano | |
| 2003/0133310 | A1 | 7/2003 | VanDuyn et al. | |
| 2009/0268475 | A1 | 10/2009 | Ball et al. | |
| 2013/0025457 | A1 * | 1/2013 | Furuuchi ................ | F21S 45/33 96/4 |
| 2013/0141927 | A1 | 6/2013 | Kenyon et al. | |
| 2016/0158678 | A1 | 6/2016 | Ishii et al. | |
| 2017/0234503 | A1 * | 8/2017 | Buffone ................ | F21S 41/148 362/509 |
| 2018/0073701 | A1 | 3/2018 | Shin et al. | |
| 2018/0328580 | A1 * | 11/2018 | Tezuka .................... | F21S 45/10 |
| 2022/0282848 | A1 | 9/2022 | Li | |

FOREIGN PATENT DOCUMENTS

| | | | |
|---|---|---|---|
| DE | 202017005625 | U1 | 1/2018 |
| EP | 3581848 | B1 | 5/2022 |

* cited by examiner

*Primary Examiner* — Thomas M Sember
(74) *Attorney, Agent, or Firm* — Vichit Chea; Carlson, Gaskey & Olds, P.C.

(57) ABSTRACT

A device may include a vehicle component. A device may include a vent patch assembly including a frame having attachment members for removably attaching the vent patch assembly to the vehicle component.

20 Claims, 6 Drawing Sheets

VEHICLE VENT PATCHES

CROSS-REFERENCE TO RELATED APPLICATIONS

This application claims the benefit of U.S. patent application Ser. No. 18/905,479, which was filed on Oct. 3, 2024, and is incorporated herein by reference in its entirety.

TECHNICAL FIELD

This disclosure relates generally to vehicles, and more particularly to vent patches for vehicle components.

BACKGROUND

Vehicle exterior lighting systems include front and rear lamp assemblies that are configured to illuminate the surrounding areas of the vehicle. These front and rear lamp assemblies may naturally experience moisture, heat, and condensation conditions.

SUMMARY

In some aspects, the techniques described herein relate to a vehicle assembly, including: a vehicle component including a contoured body surface; and a vent patch attached to and adapted to conform to the contoured body surface.

In some aspects, the techniques described herein relate to a vehicle assembly, wherein the vehicle component is a lamp assembly of a vehicle exterior lighting system.

In some aspects, the techniques described herein relate to a vehicle assembly, wherein the vehicle component includes a passageway, and the contoured body surface is adjacent to the passageway.

In some aspects, the techniques described herein relate to a vehicle assembly, further including a first opening and a second opening that each extend through the contoured body surface.

In some aspects, the techniques described herein relate to a vehicle assembly, wherein the vent patch extends over the first opening and the second opening.

In some aspects, the techniques described herein relate to a vehicle assembly, wherein the contoured body surface is molded into the vehicle component.

In some aspects, the techniques described herein relate to a vehicle assembly, further including a heating element routed through the vent patch.

In some aspects, the techniques described herein relate to a vehicle assembly, further including a sensor system configured to sense a parameter associated with an exterior environment of the vehicle component.

In some aspects, the techniques described herein relate to a vehicle assembly, further including a controller operably connected to the sensor system and programmed to operate the heating element based on sensor data from the sensor system.

In some aspects, the techniques described herein relate to a vehicle assembly, wherein the sensor data includes information related to an air temperature of the exterior environment.

In some aspects, the techniques described herein relate to a vehicle assembly, wherein the sensor data includes information related to a relative humidity of the exterior environment.

In some aspects, the techniques described herein relate to a vehicle assembly, including: a vehicle component; and a vent patch assembly including a frame having attachment members for removably attaching the vent patch assembly to the vehicle component.

In some aspects, the techniques described herein relate to a vehicle assembly, wherein the vehicle component is a lamp assembly of a vehicle exterior lighting system.

In some aspects, the techniques described herein relate to a vehicle assembly, wherein the frame includes a contoured body surface.

In some aspects, the techniques described herein relate to a vehicle assembly, wherein a vent patch of the vent patch assembly is attached and conforms to the contoured body surface.

In some aspects, the techniques described herein relate to a vehicle assembly, wherein the attachment members are arranged on opposed ends of the frame.

In some aspects, the techniques described herein relate to a vehicle assembly, wherein the attachment members are brackets that extend over an outer surface of the vehicle component, and each of the attachment members is attached to the vehicle component by a respective fastener.

In some aspects, the techniques described herein relate to a vehicle assembly, wherein the attachment members are dovetail flanges sized to engage slots formed in the vehicle component.

In some aspects, the techniques described herein relate to a vehicle assembly, further including a sensor system configured to sense a parameter associated with an exterior environment of the vehicle component.

In some aspects, the techniques described herein relate to a vehicle assembly, further including a controller operably connected to the sensor system and programmed to operate a heating element based on sensor data from the sensor system, wherein the heating element is routed through a vent patch of the vent patch assembly.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure details vent patches for vehicles. The vent patch may be configured for maintaining air circulation through a vehicle component. An exemplary vent patch may be pleated to provide an increased area of effect for venting the vehicle component. These and other features are discussed in greater detail in the following paragraphs of this detailed description.

Figure 1:
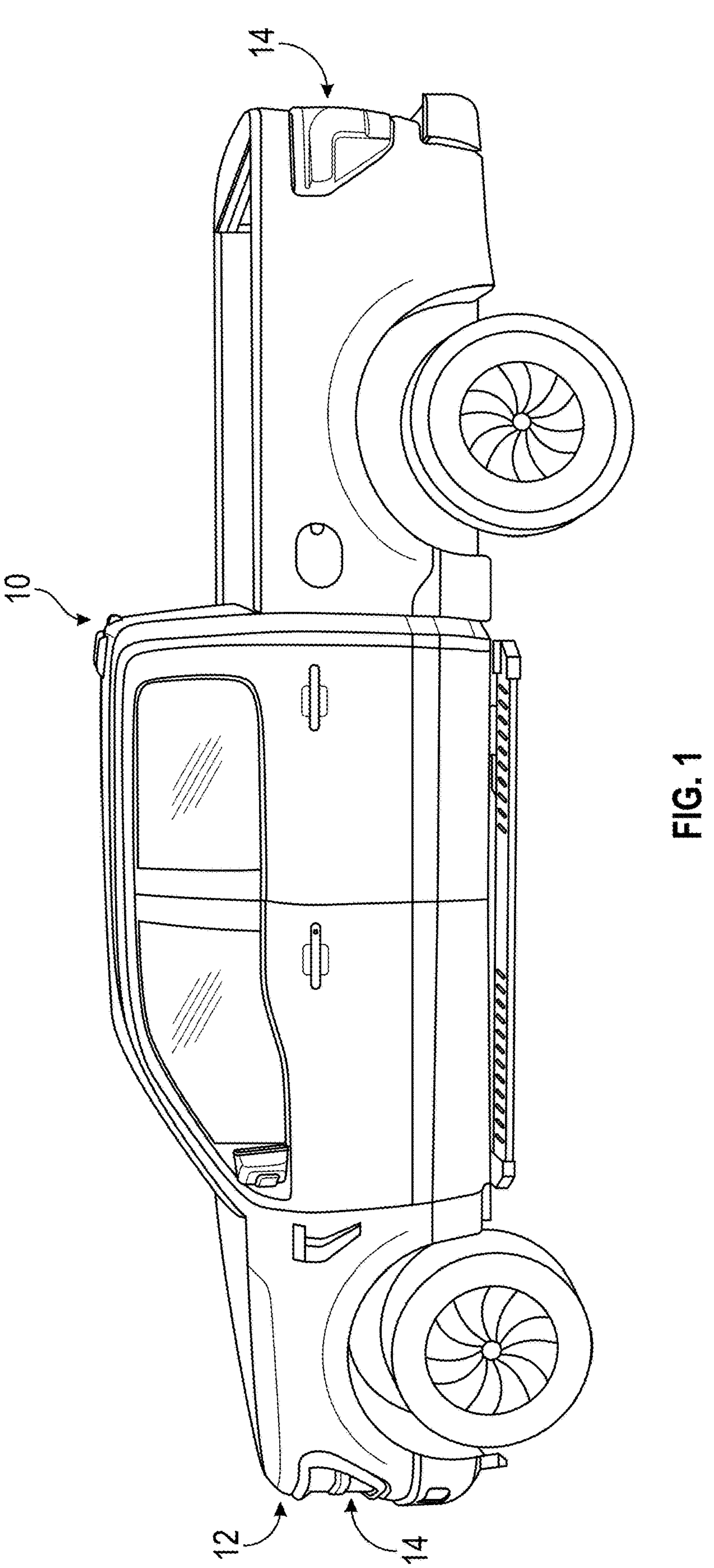
FIG. 1 schematically illustrates a vehicle equipped with an exterior lighting system.

FIG. 1 schematically illustrates a motor vehicle 10 (hereinafter referred to simply as "the vehicle") that includes an exterior lighting system 12. The vehicle 10 could be a pickup truck, a car, a van, a sport utility vehicle, or any other type of vehicle. Additionally, the vehicle 10 could be a conventional, internal combustion engine powered vehicle, a hybrid or plug-in hybrid vehicle, a battery electric vehicle, an autonomous vehicle (i.e., a driverless vehicle), etc.

Although a specific component relationship is illustrated in the figures of this disclosure, the illustrations are not intended to limit this disclosure. The placement and orientation of the various components of the depicted vehicles are shown schematically and could vary within the scope of this disclosure. In addition, the various figures accompanying this disclosure are not necessarily drawn to scale, and some features may be exaggerated or minimized to emphasize certain details of a particular component or system.

The exterior lighting system 12 may be configured to illuminate surrounding areas of the vehicle 10 and includes at least one lamp assembly 14. In an exemplary embodiment, the exterior lighting system 12 includes four lamp assemblies 14 (e.g., two headlamp assemblies and two taillamp assemblies). However, the exterior lighting system 12 could include any combination of front, rear, and/or side lamp assemblies for illuminating the surrounding areas of the vehicle 10.

Figure 2:
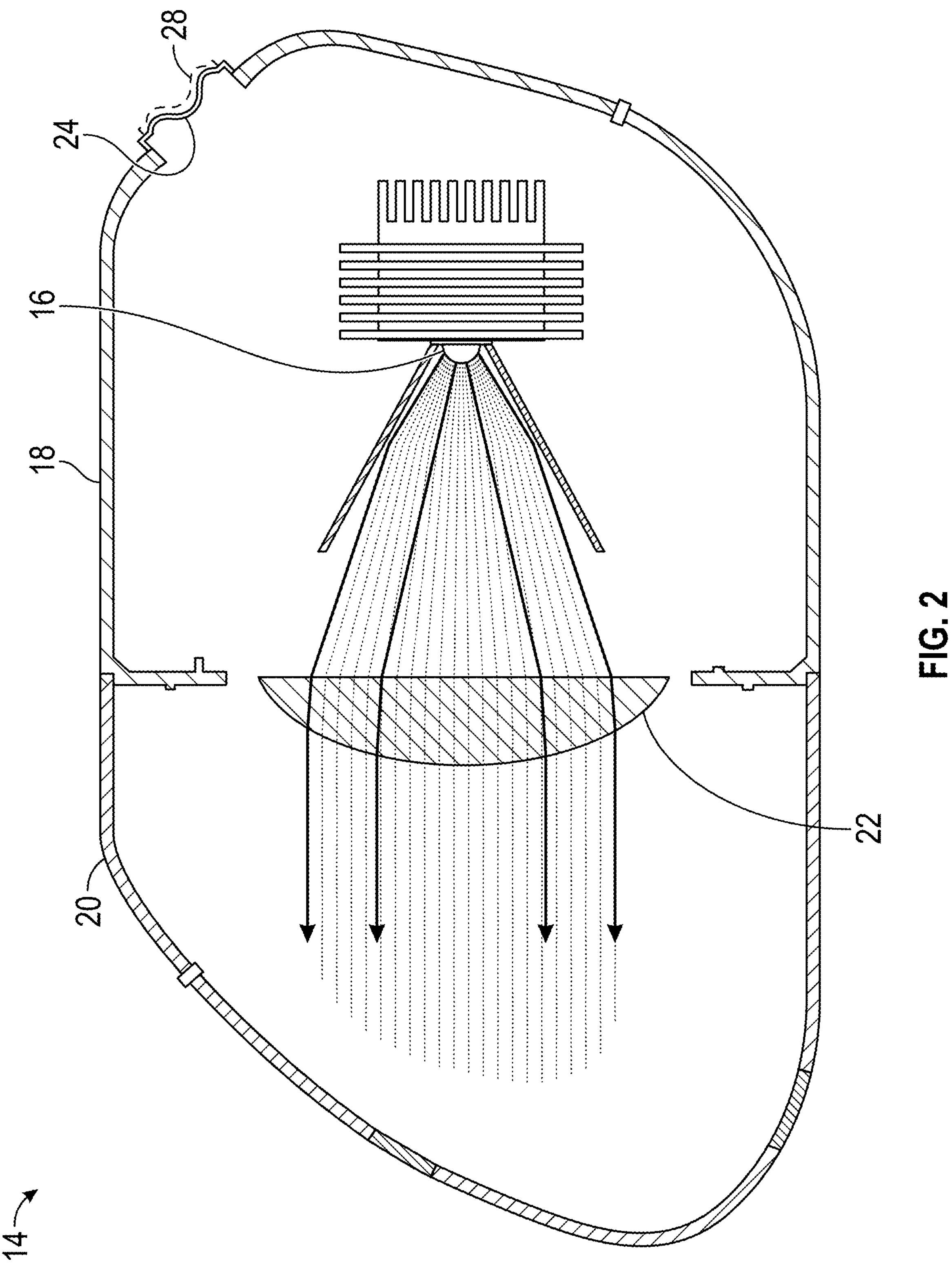
FIG. 2 schematically illustrates a lamp assembly of the vehicle of FIG. 1.

FIG. 2 further illustrates one of the lamp assemblies 14 of the vehicle 10 of FIG. 1. The lamp assembly 14 may include one or more light sources 16 (e.g., light-emitting diodes) enclosed within a housing 18 by an outer lens 20. An inner lens 22 may be included to focus and direct light emitted from the light sources 16. The design and shape of the inner lens 22 may vary based on the type of lamp (e.g., halogen, LED, HID) and the specific requirements for light pattern and distribution. The specific configuration of each of the light sources 16, the housing 18, the outer lens 20, and the inner lens 22 is not intended to limit this disclosure. It should therefore be appreciated that the lamp assembly 14 could embody any of a variety of sizes, shapes, configurations, etc.

The housing 18 may additionally include a contoured body surface 24. The contoured body surface 24 may be molded into the housing 18. The contoured body surface 24 may be configured to allow airflow circulation between an exterior and interior of the housing 18.

A vent patch 28 may be attached to the contoured body surface 24 of the housing 18 such that the vent patch 28 is exposed to the exterior environment of the lamp housing 18. The vent patch 28 functions to allow airflow circulation between the interior of the lamp assembly 14 and its exterior environment while blocking ingress of contaminants such as dirt, debris, moisture, etc. The vent patch 28 promotes pressure and environmental equalization, which can reduce condensation build-up within the interior of the lamp assembly 14.

The lamp assembly 14 is an exemplary type of vehicle component that can include a vent patch. However, other vehicle components of the vehicle 10 could require the use of a vent patch for achieving proper functionality. The teachings of this disclosure could therefore extend to any vehicle component that utilizes a vent patch for air circulation and/or pressure equalization.

Figure 3:
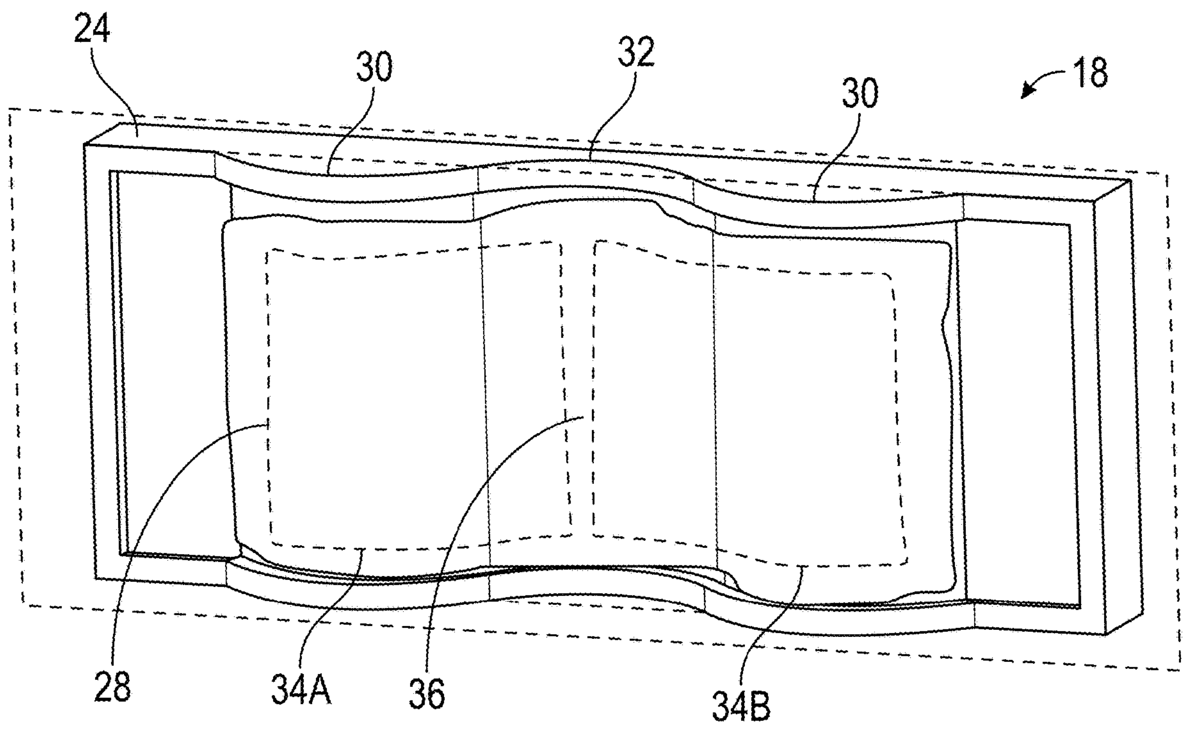
FIG. 3 is a perspective view of a vent patch attached to a housing of the lamp assembly of FIG. 2.
Figure 4:
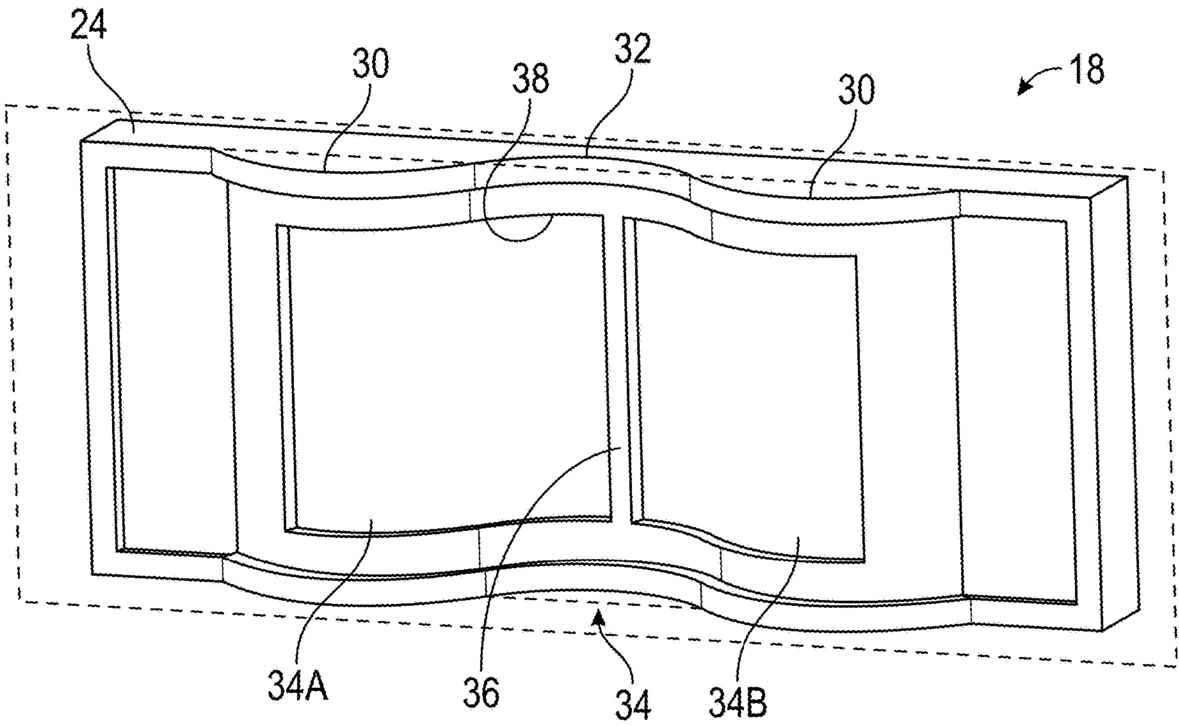
FIG. 4 is a perspective view of the housing of FIG. 2 with the vent patch removed.

Referring to FIGS. 3 and 4, with continuing reference to FIG. 2, the contoured body surface 24 may have a pleated configuration formed by a series of alternating peaks 30 and valleys 32. The peaks 30 and the valleys 32 may be evenly spaced. The peaks 30 may project outward away from the interior of the housing 18. The valleys 32 may project inward toward the interior of the housing 18. The pleated configuration is molded into the housing such that the peaks 30 and the valleys 32 repeat in a continuous pattern. In the illustrated embodiment, the contoured body surface 24 includes two peaks 30 and a single valley 32. However, the contoured body surface 24 could be designed to include any number of peaks and valleys within the scope of this disclosure.

In the illustrated embodiment, the pleated configuration (e.g., the peaks 30 and the valleys 32) of the contoured body surface 24 is curved or rounded, and thus creates a wave-like pattern. In other embodiments, the pleated configuration could form another pattern having pointed or angular peaks and valleys, for example.

The contoured body surface 24 may include one or more openings 34 to allow for airflow circulation between the interior and exterior environments of the housing 18. In the illustrated embodiment, the contoured body surface 24 may include a first opening 34A and a second opening 34B. The first opening 34A may intersect one of the peaks 30 and the valley 32, and the second opening 34B may intersect the valley 32 and the other one of the peaks 30. Airflow through the openings 34 helps to both dissipate heat generated by the light sources 16 and reduce condensation within the interior of the lamp assembly 14, for example (FIG. 2).

A support member 36 may span vertically between the first opening 34A and the second opening 34B. The support member 36 serves to support or otherwise hold the vent patch 28 in place on the contoured body surface 24 while also preventing the vent patch 28 from falling through one of the openings 34 and into the housing 18 (FIG. 2). Depending on the size and shape of the openings 34, the number and orientation of support members 36 (e.g., vertical, horizontal, or cross pattern) can be chosen to ensure even support and proper attachment of the vent patch 28.

The vent patch 28 may be attached to the contoured body surface 24. The vent patch 28 may extend over the first and second openings 34A, 34B of the contoured body surface 24. The vent patch 28 may be breathable such that it allows airflow circulation between the interior of the lamp assembly 14 and its exterior environment while blocking contaminants (e.g., dirt, debris, moisture, etc.) from entering the housing 18 (FIG. 2).

In an embodiment, the vent patch 28 is attached to the contoured body surface 24 by an adhesive or epoxy.

The vent patch 28 is designed to conform to the contoured body surface 24. For example, when the vent patch 28 is not attached to the contoured body surface 24 (FIG. 5), the vent patch 28 is flat and two-dimensional (2D). When the vent patch 28 is attached to the contoured body surface 24 (FIG. 3), the vent patch 28 acquires a three-dimensional (3D) shape by conforming to the pleated configuration of the contoured body surface 24. That is, the contoured body surface 24 gives the vent patch 28 pleats (e.g., alternating peaks and valleys) that conform to the shape of the peaks 30 and valleys 32 of the contoured body surface 24. The pleats increase the surface area of the vent patch 28 by adding depth and dimension. The increased surface area of the vent patch 28 is effective to prevent condensation formation within the housing 18 by allowing better moisture exchange.

For example, when the light sources 16 are turned on, the lamp assembly 14 generates heat, causing the air within the housing 18 to warm up (FIG. 2). As the warm air within the housing 18 rises and exits through the vent patch 28, cooler air from the exterior environment enters, reducing the humidity levels inside the lamp. The increased surface area of the vent patch 28 helps prevent moisture from accumulating within the housing 18 by both increasing the effective area for moisture to escape and blocking the ingress of contaminants from the exterior environment. The increased surface area of the vent patch 28 is also effective to balance pressure within the housing 18 by enabling smoother, less turbulent airflow. For example, as temperature fluctuates, pressure differentials between the inside and outside of the housing 18 can change. The increased surface area allows the pressure to equalize more effectively by allowing more air to circulate in and out of the housing 18, thereby preventing pressure buildup.

Figure 5:
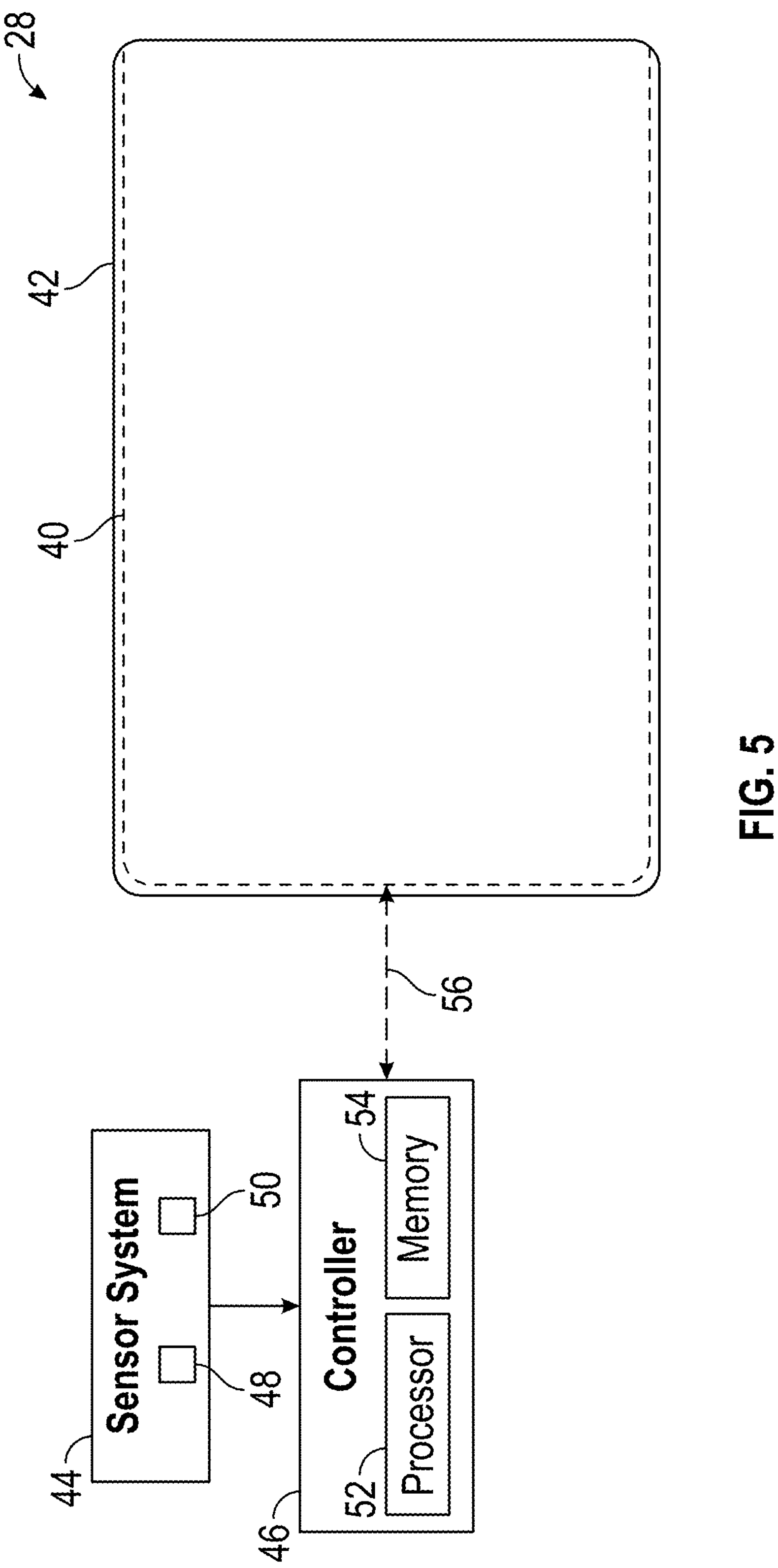
FIG. 5 schematically illustrates heating operations of a vent patch.

Referring now primarily to FIG. 5, a heating element (e.g., wire) 40 (indicated in dashed lines for illustrative purposes) may be routed through the vent patch 28. In an embodiment, the heating element 40 extends along an edge portion 42 of the vent patch 28. The heating element 40 is configured to heat air that it is circulated through the housing 18 of the lamp assembly 14.

The vehicle 10 may additionally include a sensor system 44 and a controller 46 that are operably connected to one another. The sensor system 44 may include a plurality of sensors arranged and configured for monitoring an exterior environment of the lamp assembly 14. In an embodiment, the sensor system 44 includes one or more of a temperature sensor 48 and a humidity sensor 50. The temperature sensor 48 and the humidity sensor 50 may be mounted on the vehicle 10 at various locations suitable for measuring conditions of the vehicle exterior environment, such as air temperature and relative humidity, for example.

Although schematically illustrated as a single controller, the controller 46 may be part of a vehicle control system that includes a plurality of additional control modules for interfacing with and commanding operations of the heating element 40. In an embodiment, the controller 46 is part of a body control module (BCM) of the vehicle 10. However, other configurations are also contemplated within the scope of this disclosure.

The controller 46 may include both hardware and software and may be programmed with executable instructions for interfacing with and commanding operation of various components of the heating element 40 as part of a strategy for reducing condensation within the housing 18. The controller 46 may include a processor 52 and non-transitory memory 54 for executing various control strategies and modes associated with the heating element 40. The processor 52 may be a custom made or a commercially available processor, a central processing unit (CPU), or generally any device for executing software instructions. The memory 54 can include any one or combination of volatile memory elements and/or nonvolatile memory elements. The processor 52 may be operably coupled to the memory 54 and may be configured to execute one or more programs stored in the memory based on various inputs received from the sensor system 44.

The heating element 40 may be operably connected to the controller 46 over a communication bus 56. In an embodiment, the communication bus 56 is a wired communication bus such as a controller area network (CAN) bus or a local interconnect network (LIN) bus, for example. In another embodiment, the communication bus 56 is a wireless communication bus such as that provided by Wi-Fi, Bluetooth®, Ultra-Wide Band (UWB), etc.

The sensor system 44 may periodically communicate sensor data to the controller 46. The controller 46 may analyze the sensor data received from the sensor system 44 for determining conditions of the vehicle exterior environment that can increase the likelihood of condensation forming within the housing 18. For example, the controller 46 may utilize program logic to infer that condensation may form within the housing 18 when the air temperature detected by the temperature sensor 48 and/or the relative humidity detected by the humidity sensor 50 is above a predefined threshold.

The controller 46 may be programmed to operate the heating element 40 based on the sensor data received from the sensor system 44. In an embodiment, the controller 46 activates the heating element 40 when the air temperature and the relative humidity both exceed a respective predefined threshold. In a further embodiment, if the heating element 40 is activated, the controller 46 can deactivate the heating element 40 when the air temperature and the relative humidity are less than the respective predefined thresholds. When activated, the heating element 40 heats the air that circulates in and out of the housing 18. By controlling the operation of the heating element 40, the controller 46 can maintain an air temperature within the interior environment of the housing 18 that is above the dew point of the air outside the housing 18 (i.e., the air from the exterior environment) and thus reduce condensation formation within the housing 18.

In this disclosure, like reference numerals designate like elements where appropriate and reference numerals with the addition of one-hundred or multiples thereof designate modified elements that are understood to incorporate the same features and benefits of the corresponding elements.

Figure 6:
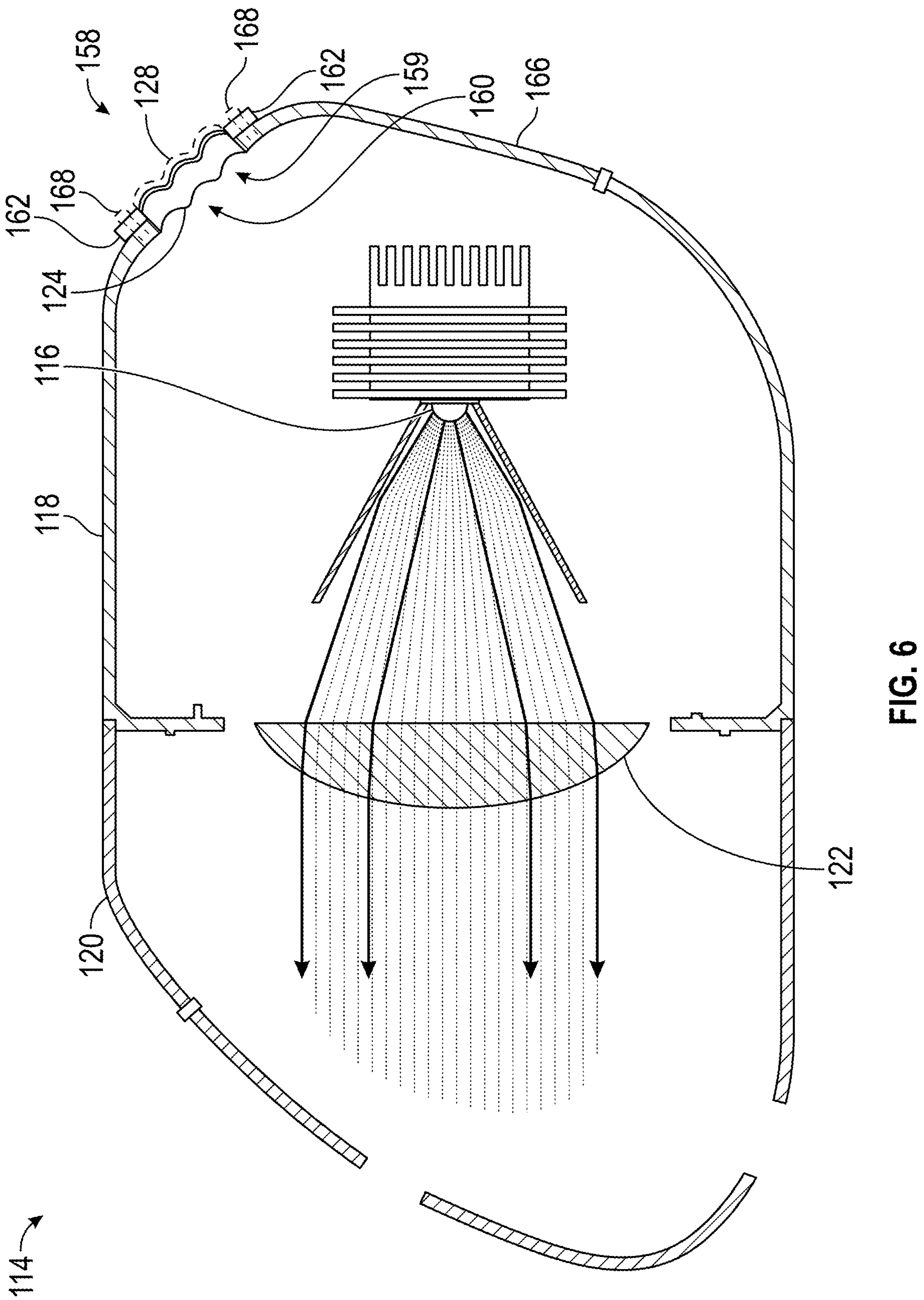
FIG. 6 schematically illustrates another exemplary lamp assembly.
Figure 7:
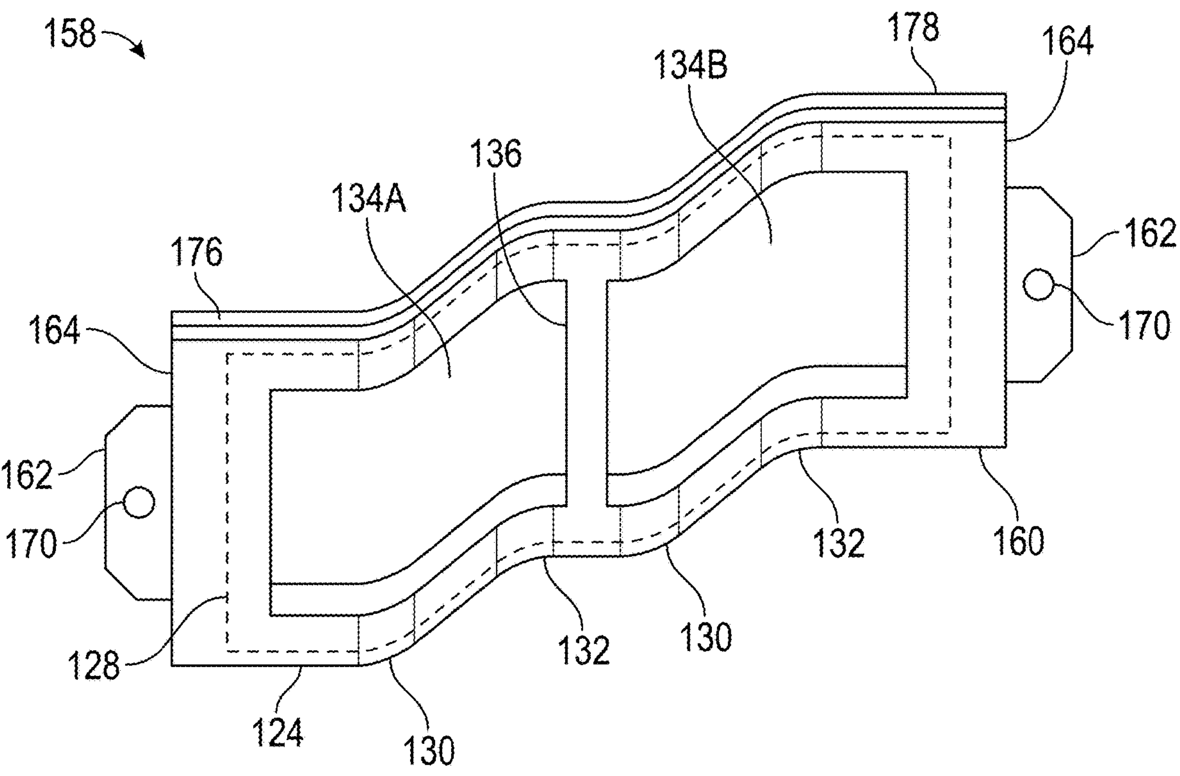
FIG. 7 illustrates a vent patch assembly attached to a housing of the lamp assembly of FIG. 6.

FIGS. 6 and 7 illustrate another exemplary lamp assembly 114. The lamp assembly 114 is similar to the lamp assembly discussed above, however, in this embodiment, a vent patch assembly 158 is removably attached to a housing 118 of the lamp assembly 114.

A passageway 159 may be formed through the housing 118. The passageway 159 is an opening that allows for airflow circulation between an interior of the lamp assembly 114 and its exterior environment.

The vent patch assembly 158 may be arranged adjacent or otherwise near the passageway 159 of the housing 118. The vent patch assembly 158 includes a frame 160 having a contoured body surface 124 and a vent patch 128 (indicated in dashed lines for illustrative purposes) attached and conforming to the contoured body surface 124. The frame 160 may be flexible and may extend over the passageway 159.

The contoured body surface 124 may have a pleated configuration formed by a series of equally spaced and alternating peaks 130 and valleys 132. The contoured body surface 124 may include a first opening 134A and a second opening 134B. A support member 136 spans vertically between the first and second openings 134A, 134B. The vent patch 128 extends over the first and second openings 134A, 134B.

The vent patch assembly 158 may be removably attached to the housing 118 by a pair of attachment members 162. The attachment members 162 are arranged on opposed ends 164 of the frame 160. In an embodiment, the attachment members 162 are molded into the opposed ends 164. However, the attachment members 162 could be secured to the opposed ends 164 by an adhesive or a mechanical connector (e.g., screw, bolt, etc.).

Figure 8:
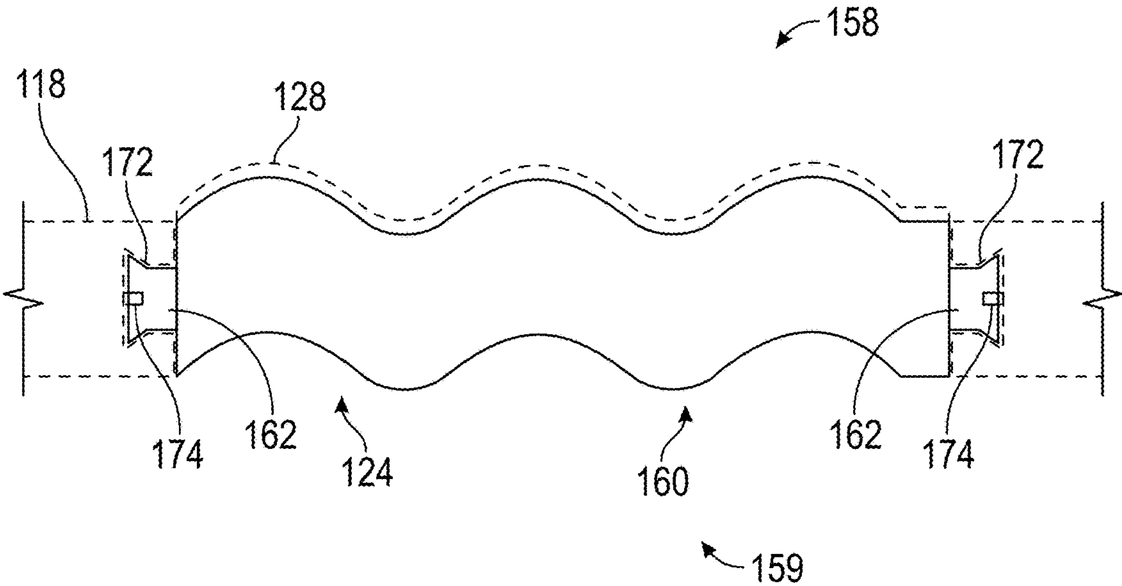
FIG. 8 is a close-up view of another exemplary lamp assembly.

The attachment members 162 may be used to attach and remove the vent patch assembly 158 from the housing 118. In the illustrated embodiment, the attachment members 162 are brackets that extend over an outer surface 166 of the housing 118. A fastener 168 may be inserted through a hole 170 formed in each of the attachment members 162 and into a corresponding hole formed in the housing 118. In another embodiment, the attachment members 162 are dovetail flanges sized to engage a matching dovetail slot 172 formed adjacent to the passageway 159 of the housing 118 (FIG. 8). The attachment members 162 and/or the housing 118 may include a locking mechanism 174 to ensure that the dovetail attachment remains securely attached. In an embodiment, each locking mechanism 174 projects from an end of the dovetail slot 172 and engages or otherwise holds a corresponding end of the attachment member 162. The attachment members 162 allow for quick and secure attachment and removal of the vent patch assembly 158 without touching the vent patch 128.

A seal 176 may be arranged to seal an interface between the frame 160 and the walls of the passageway 159 (FIG. 7). In an embodiment, the seal 176 is applied around an outer perimeter 178 of the frame 160. The seal 176 helps manage temperature and pressure within the housing 118 by preventing leakage around the outer perimeter 178.

The vent patches of this disclosure provide improved the performance of vehicle components. Among other benefits, the vent patches are designed with an increased surface area to reduce internal condensation and pressure buildup within vehicle components.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A vehicle assembly, comprising:

a vehicle component; and a vent patch assembly including a frame having attachment members for removably attaching the vent patch assembly to the vehicle component, wherein the frame includes a contoured body surface with a pleated configuration.

2. The vehicle assembly as recited in claim 1, wherein the vehicle component is a lamp assembly of a vehicle exterior lighting system.

3. The vehicle assembly as recited in claim 1, wherein a vent patch of the vent patch assembly is attached and conforms to the pleated configuration of the contoured body surface.

4. The vehicle assembly as recited in claim 3, further comprising a first opening and a second opening each extending through the contoured body surface, wherein the vent patch extends over the first opening and the second opening.

5. The vehicle assembly as recited in claim 4, further comprising at least one support member extending between the first opening and the second opening, the support member configured to hold the vent patch in place on the contoured body surface and inhibit the vent patch from entering one of the first opening and the second opening.

6. The vehicle assembly as recited in claim 3, wherein the vehicle component includes a passageway for allowing airflow circulation between an interior of the vehicle component and its exterior environment, and the frame extends over the passageway.

7. The vehicle assembly as recited in claim 6, wherein the contoured body surface is adjacent to the passageway.

8. The vehicle assembly as recited in claim 1, wherein the attachment members are arranged on opposed ends of the frame.

9. The vehicle assembly as recited in claim 8, wherein the attachment members are brackets that extend over an outer surface of the vehicle component, and each of the attachment members is attached to the vehicle component by a respective fastener.

10. The vehicle assembly as recited in claim 8, wherein the attachment members are dovetail flanges sized to engage slots formed in the vehicle component, further comprising a locking mechanism projecting from an end of each of the slots and engaging a corresponding end of the dovetail flanges.

11. The vehicle assembly as recited in claim 1, wherein the frame is flexible.

12. The vehicle assembly as recited in claim 1, further comprising a seal arranged around an outer perimeter of the frame to seal an interface between the frame and walls of a passageway of the vehicle component.

13. The vehicle assembly as recited in claim 1, wherein the attachment members are configured to allow attachment and removal of the vent patch assembly from the vehicle component without touching a vent patch of the vent patch assembly.

14. The vehicle assembly as recited in claim 1, wherein the contoured body surface includes a first opening and a second opening each extending through the contoured body surface, and a support member spanning between the first opening and the second opening, wherein a vent patch of the vent patch assembly extends over the first opening, the second opening, and the support member, and wherein the at least one support member is configured to hold the vent patch in place on the contoured body surface.

15. A vehicle assembly, comprising:

a vehicle component;

a vent patch assembly including a frame having attachment members for removably attaching the vent patch assembly to the vehicle component;

a sensor system configured to sense a parameter associated with an exterior environment of the vehicle component; and a controller operably connected to the sensor system and programmed to operate a heating element based on sensor data from the sensor system, wherein the heating element is routed through a vent patch of the vent patch assembly.

16. The vehicle assembly as recited in claim 15, wherein the heating element is a wire extending along an edge portion of the vent patch.

17. The vehicle assembly as recited in claim 15, wherein the sensor data includes information related to a relative humidity of the exterior environment.

18. The vehicle assembly as recited in claim 15, wherein the sensor data includes information related to an air temperature of the exterior environment.

19. A vehicle assembly, comprising:

a vehicle component; and a vent patch assembly including a frame having a contoured body surface with a pleated configuration and attachment members for removably attaching the vent patch assembly to the vehicle component, and a vent patch, the vent patch attachable to the contoured body surface, wherein, when the vent patch is not attached to the contoured body surface, the vent patch is flat and two-dimensional, and when the vent patch is attached to the contoured body surface, the vent patch acquires a three-dimensional shape by conforming to the pleated configuration of the contoured body surface.

20. The vehicle assembly as recited in claim 19, wherein the vent patch has a flattened planar shape when not attached to the contoured body surface.

* * * * *